United States Patent
Schroeder

(10) Patent No.: US 12,302,771 B2
(45) Date of Patent: May 20, 2025

(54) SYSTEMS AND METHODS FOR DETECTING MATERIAL ACCUMULATION RELATIVE TO DISK GANG ASSEMBLIES OF AGRICULTURAL IMPLEMENTS

(71) Applicant: CNH Industrial America LLC, New Holland, PA (US)

(72) Inventor: Brittany Schroeder, Lowell, IN (US)

(73) Assignee: CNH Industrial America, New Holland, PA (US)

( * ) Notice: Subject to any disclaimer, the term of this patent is extended or adjusted under 35 U.S.C. 154(b) by 785 days.

(21) Appl. No.: 17/215,088

(22) Filed: Mar. 29, 2021

(65) Prior Publication Data

US 2022/0304213 A1    Sep. 29, 2022

(51) Int. Cl.
*A01B 63/112* (2006.01)
*A01B 5/08* (2006.01)

(52) U.S. Cl.
CPC .............. *A01B 63/112* (2013.01); *A01B 5/08* (2013.01)

(58) Field of Classification Search
CPC ................................ A01B 63/112; A01B 5/08
See application file for complete search history.

(56) References Cited

U.S. PATENT DOCUMENTS

| | | |
|---|---|---|
| 7,104,340 B1 | 9/2006 | Thompson et al. |
| 9,485,900 B2 | 11/2016 | Connell et al. |
| 10,172,273 B2 | 1/2019 | Gschwendtner et al. |
| 10,485,154 B2 | 11/2019 | Connell et al. |
| 2016/0088787 A1* | 3/2016 | Connell et al. ........ A01B 76/00 701/33.9 |
| 2020/0107494 A1 | 4/2020 | Schoeny et al. |
| 2020/0146199 A1 | 5/2020 | Pasquier et al. |
| 2020/0238960 A1 | 7/2020 | Thompson |
| 2021/0029865 A1 | 2/2021 | Smith et al. |
| 2021/0045278 A1 | 2/2021 | Henry |
| 2022/0192076 A1* | 6/2022 | Sharma et al. ........ G05D 1/0088 |

FOREIGN PATENT DOCUMENTS

| | | | |
|---|---|---|---|
| CA | 3146571 A1 * | 2/2021 | ........... A01B 29/048 |
| EP | 3342264 B1 | 9/2020 | |

OTHER PUBLICATIONS

European Search Report Corresponding to Application No. 22164366 on Sep. 7, 2022.

* cited by examiner

*Primary Examiner* — Tara Mayo
(74) *Attorney, Agent, or Firm* — Rebecca Henkel; Rickard K. DeMille; Peter K. Zacharias

(57) ABSTRACT

A system for detecting material accumulation relative to disk gang assemblies of an agricultural implement includes an implement frame and a disk gang assembly supported relative to the implement frame. The disk gang assembly includes a toolbar coupled to the implement frame and a plurality of disks supported by the toolbar. The system also includes a load sensor configured to provide data indicative of an applied load through the disk gang assembly, and a computing system communicatively coupled to the load sensor. The computing system is configured to monitor the load applied through the disk gang assembly based on the data provided by the load sensor, compare the monitored load to a load threshold selected for the disk gang assembly, and determine that the disk gang assembly is in a plugged state when the monitored load differs from the load threshold.

16 Claims, 5 Drawing Sheets

SYSTEMS AND METHODS FOR DETECTING MATERIAL ACCUMULATION RELATIVE TO DISK GANG ASSEMBLIES OF AGRICULTURAL IMPLEMENTS

FIELD OF THE INVENTION

The present disclosure generally relates to agricultural implements and, more particularly, to systems and methods for detecting material accumulation relative to disk gang assemblies of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more tools configured to engage the soil as the implement is moved across the field. For example, in certain configurations, the implement may include one or more harrow disks, leveling disks, rolling baskets, shanks, tines, and/or the like. Such tools loosen and/or otherwise agitate the soil to prepare the field for subsequent planting operations.

During tillage operations, field materials, such as residue, soil, rocks, and/or the like, may become trapped or otherwise accumulate between adjacent tools, such as adjacent disks of a disk gang assembly. Such accumulations of field materials may inhibit the operation of the disks in a manner that prevents such disks from providing adequate tillage to the field. In such instances, it is necessary for the operator to take certain corrective actions to remove the material accumulation. However, it may be difficult for the tillage implement operator to determine when material accumulation has occurred relative to a given disk gang assembly.

Accordingly, a system and related method for detecting material accumulation relative to disk gang assemblies of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for detecting material accumulation relative to disk gang assemblies of an agricultural implement. The system includes an implement frame and a disk gang assembly supported relative to the frame. The disk gang assembly includes a toolbar coupled to the frame and a plurality of disks supported by the toolbar. The system also includes a load sensor configured to provide data indicative of an applied load through the disk gang assembly, and a computing system communicatively coupled to the load sensor. The computing system is configured to monitor the load applied through the disk gang assembly based on the data provided by the load sensor, compare the monitored load to a load threshold selected for the disk gang assembly, and determine that the disk gang assembly is in a plugged state when the monitored load differs from the load threshold.

In a further aspect, the present subject matter is directed to a method for detecting material accumulation relative to disk gang assemblies of an agricultural implement. The agricultural implement includes a frame and a disk gang assembly supported relative to the frame, with the disk gang assembly including a toolbar coupled to the frame and a plurality of disks supported by the toolbar. The method includes receiving, with a computing system, data indicative of an applied load through the disk gang assembly, comparing, with the computing system, the load to a load threshold selected for the disk gang assembly, determining, with the computing system, that the disk gang assembly is in a plugged state when the load differs from the load threshold, and initiating, with the computing system, a control action when it is determined the disk gang assembly is in the plugged state.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
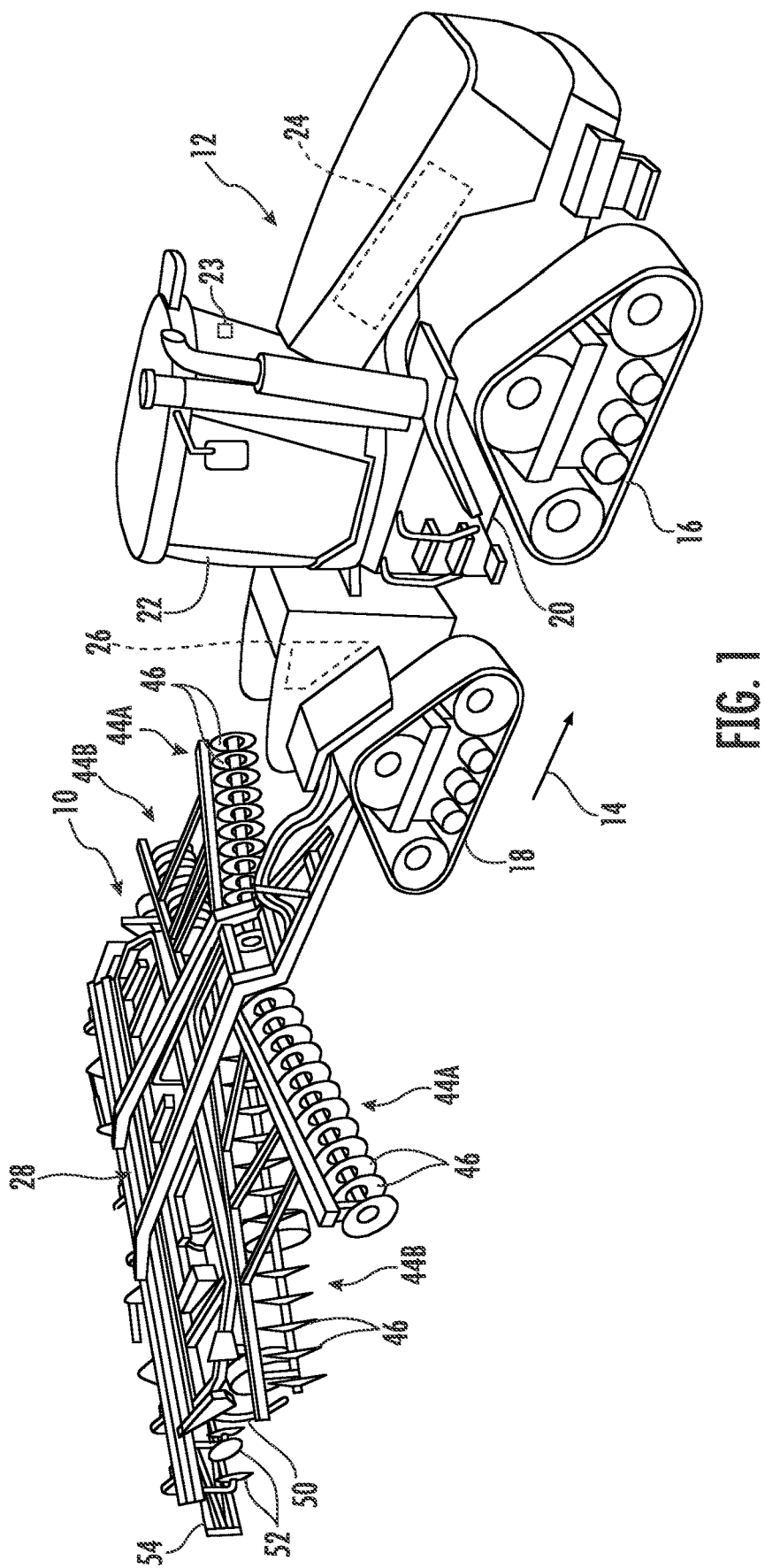
FIG. 1 illustrates a perspective view of one embodiment of an agricultural implement in accordance with aspects of the present subject matter, particularly illustrating the implement being towed by a work vehicle.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to systems and methods for detecting material accumulation relative to disk gang assemblies of an agricultural implement. In several embodiments, a computing system may be configured to monitor an applied load through a disk gang assembly to determine or infer when the disk gang assembly is plugged or is otherwise experiencing plugging-related conditions. Specifically, the monitored load may be compared to an applicable load threshold and, when the monitored load differs from the threshold (e.g., by exceeding the threshold), the computing system may determine or infer that the corresponding disk gang assembly is plugged. Upon making such a determination, the computing system may be configured to automatically initiate a control action, such as by generating an operator notification and/or automatically adjusting the operation of the implement.

Figure 2:
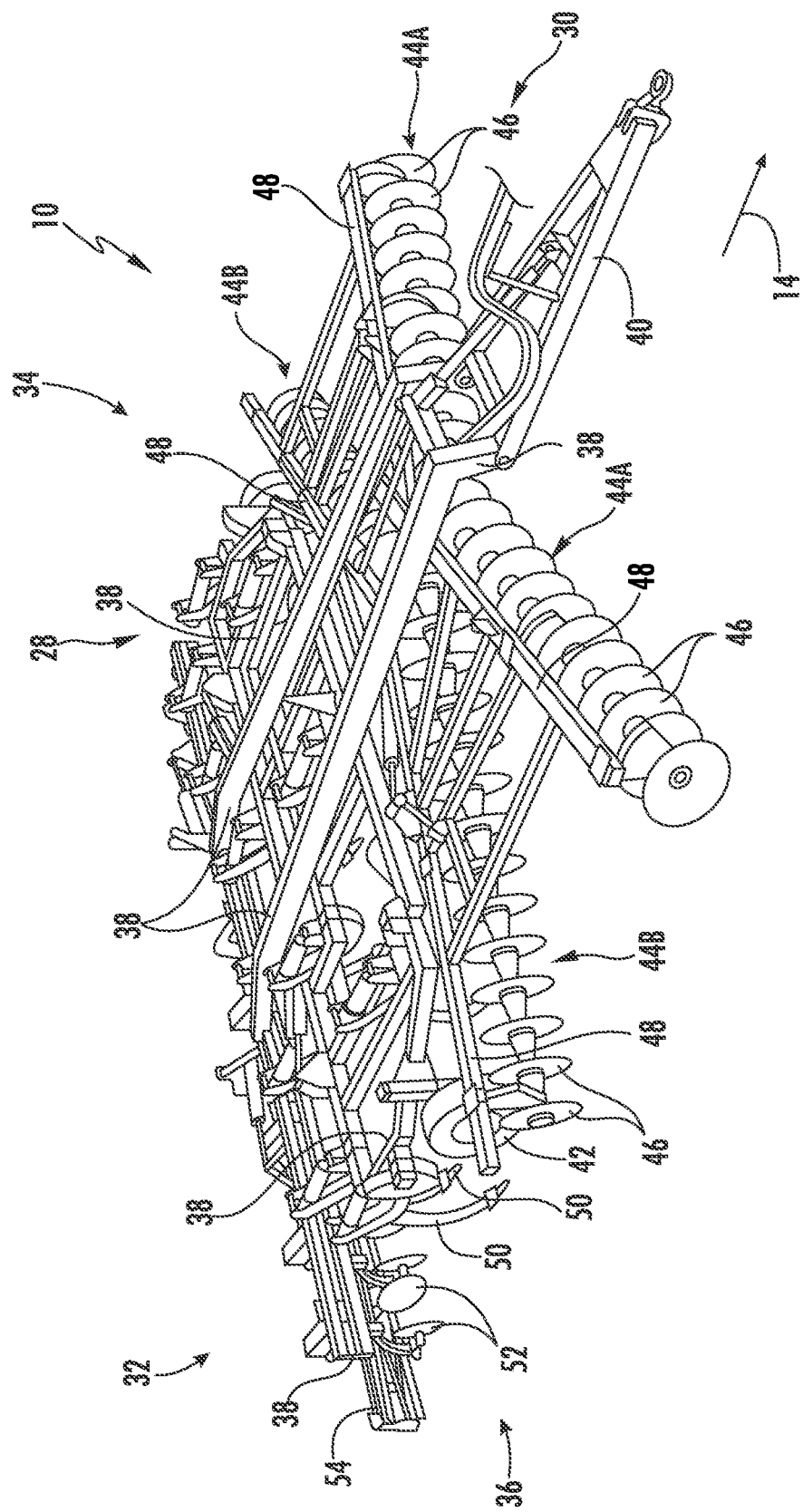
FIG. 2 illustrates another perspective view of the agricultural implement shown in FIG. 1 in accordance with aspects of the present subject matter.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. Alternatively, the track assemblies 16, 18 can be replaced with tires or other suitable traction members. An operator's cab 22 may be supported by a portion of the chassis 20 and may house various input devices (e.g., a user interface 23) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown in FIG. 2) may be coupled to the frame 28 to facilitate towing the implement 10 in the direction of travel 14.

In several embodiments, the frame 28 may be configured to support various ground-engaging tools. For instance, the frame 28 may support one or more disk gang assemblies 44. As illustrated in FIG. 2, each disc gang assembly 44 includes a toolbar 48 coupled to the implement frame 28 and a plurality of harrow disks 46 supported by the toolbar 48 relative to the implement frame 28. Each harrow disk 46 may, in turn, be configured to penetrate into or otherwise engage the soil as the implement 10 is being pulled through the field. As is generally understood, the various disk gang assemblies 44 may be oriented at an angle relative to the direction of travel 14 to promote more effective tilling of the soil. In the embodiment shown in FIGS. 1 and 2, the implement 10 includes four disk gang assemblies 44 supported relative to the frame 28 at a location forward of the remainder of the ground-engaging tools. Specifically, the implement 10 includes a pair of front disk gang assemblies 44A (e.g., left and right front disk gang assemblies 44A) and a pair of rear disc gang assemblies 44B (e.g., left and right rear disk gang assemblies 44B) positioned aft or rearward of the front disk gang assemblies 44A relative to the direction of travel 14 of the implement 10. However, it should be appreciated that, in alternative embodiments, the implement 10 may include any other suitable number of disk gang assemblies 44, such as more or less than four disk gang assemblies 44. Furthermore, in one embodiment, the disk gang assemblies 44 may be mounted to the frame 28 at any other suitable location, such as adjacent to its aft end 32.

Additionally, as shown, in one embodiment, the implement frame 28 may be configured to support other ground-engaging tools. For instance, in the illustrated embodiment, the frame 28 is configured to support a plurality of shanks 50 configured to rip or otherwise till the soil as the implement 10 is towed across the field. Furthermore, in the illustrated embodiment, the frame 28 is also configured to support one or more finishing tools, such as a plurality of leveler disks 52 and/or rolling (or crumbler) basket assemblies 54. However, in other embodiments, any other suitable ground-engaging tools may be coupled to and supported by the implement frame 28, such as a plurality of closing discs.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
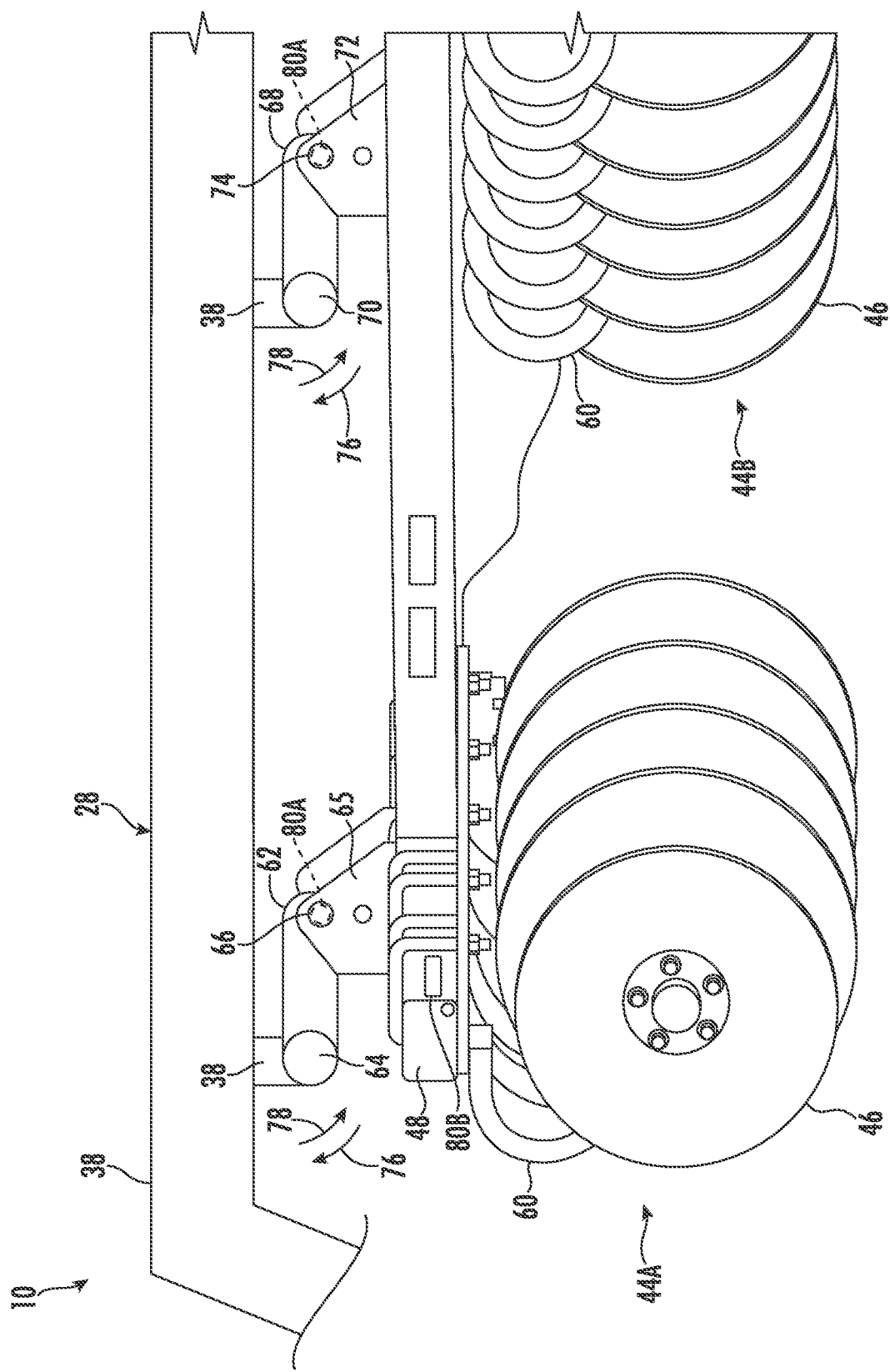
FIG. 3 illustrates a side view of a portion of the agricultural implement shown in FIGS. 1 and 2, particularly illustrating portions of two disk gang assemblies of the implement in accordance with aspects of the present subject matter.

Referring now to FIG. 3, a side view of a portion of the implement 10 described above with reference to FIGS. 1 and 2 is illustrated in accordance with aspects of the present subject matter, particularly illustrating a side view of portions of the left side front and rear disk gang assemblies 44A, 44B of the implement 10. As indicated above, each disc gang assembly 44 may include a plurality of harrow disks 46 supported relative to a toolbar 48, such as via a plurality of hangers 60 (e.g., C-hangers). The toolbar 48 of each disk gang assembly 44A, 44B is, in turn, configured to be coupled the implement frame 28.

For instance, as shown in FIG. 3, the toolbar 48 of the front disk gang assembly 44A is coupled to an adjacent frame member 38 of the implement frame 28 via a front support arm 62 and a front rockshaft 64 of the implement 10. Specifically, a first end of the forward support arm 62 is coupled to a corresponding gang bracket 65 (e.g., via a bolt or pin 66), which is, in turn, coupled to a portion of the toolbar 48 of the front disk gang assembly 44A. Additionally, an opposed, second end of the forward support arm 62 is coupled to the front rockshaft 64, which is, in turn, rotatably coupled to an adjacent frame member 38 of the implement frame 28. Similarly, as shown in FIG. 3, the toolbar 48 (not shown in FIG. 3) of the rear disk gang assembly 44B is coupled to the adjacent frame member 38 of the implement frame 28 via a rear support arm 68 and a rear rockshaft 70 of the implement 10. Specifically, a first end of the rear support arm 68 is coupled to a corresponding gang bracket 72 (e.g., via a bolt or pin 74), which is, in turn, coupled to a portion of the toolbar 48 (not shown) of the rear disk gang assembly 44B. Additionally, an opposed, second end of the rear support arm 68 is coupled to the rear rockshaft 70, which is, in turn, rotatably coupled to the adjacent frame member 38 of the implement frame 28.

In several embodiments, rotation of each rockshaft 64, 70 in a first direction (e.g., as indicated by arrow 76 in FIG. 3) adjusts the position of the disk gang assemblies 44 relative to the implement frame 28 such that the penetration depth of the disk blades 46 is increased. Similarly, rotation of each rockshaft 64, 70 in an opposite, second direction (e.g., as indicated by arrow 78 in FIG. 3) adjusts the position of the disk gang assemblies 44 relative to the implement frame 28 such that the penetration depth of the disk blades 46 is decreased. It should be appreciated that the rotation of each rockshaft 64, 70 may be controlled via a suitable actuator (not shown) (e.g., a fluid-driven actuator, such as a hydraulic cylinder) coupled between the rockshaft 64, 70 and the implement frame 28.

As the implement 10 is moved across a field, the harrow disks 46 may be configured to penetrate the soil surface of the field to a given penetration depth and rotate about their respective rotational axes relative to the soil such that field materials flow between adjacent disks 46. However, in certain instances, a plugged condition or state may occur in which field materials accumulate between adjacent disks 46. For example, when the soil in the field has high moisture content, the soil may stick or adhere to the harrow disks 46 such that the soil accumulates on and/or between the disks 46. Moreover, a large chunk of residue or a rock may become lodged between adjacent harrow disks 46 in a manner that inhibits the flow of field materials there between, thereby causing additional field materials to accumulate therein. As such, the harrow disks 46 may become plugged and not perform as intended. Such plugging typically results in the rotational speed of the harrow disks 46 being reduced. For instance, as materials accumulate relative to the harrow disks 46, the rotational resistance or friction applied by such materials may result in the rotation of the blades 46 being slowed or even stopped. Slowing or stopping of the rotation of the harrow disks 46 typically prevents the blades 46 from properly working the soil and can lead to undesirable tillage results (e.g., a lack of breaking-up of the soil or the generation of undesirable surface features, such as ridges or furrows).

Moreover, in addition to reductions in the rotational speed, the present inventor has recognized that material accumulation relative to the harrow disks 46 also results in the draft loads on the disk gang assemblies 44 being increased. Specifically, as additional field materials collect or accumulate on, around, and/or between the harrow disks 46, such materials cover a larger portion of the disks 46, thereby resulting in an effective increase in the penetration depth of the disks 46 and, thus, an increase in the draft loads associated therewith. As such, by monitoring the loads applied through a given disk gang assembly 44 during the performance of a tillage operation, it may be inferred or determined when the gang assembly 44 is plugged. For example, the draft loads on a gang assembly 44 generally vary as a function of the ground speed of the implement 10 and the penetration depth of the harrow disks 46, and this relationship can be used to establish an expected or baseline draft load range for each gang assembly 44 at various combinations of speed/depth settings (e.g., via a look-up table and/or algorithm). In such an embodiment, by monitoring the load applied through a given disk gang assembly 44 relative to a maximum load threshold for the draft load range associated with the current ground speed and depth setting, it can be inferred or determined that the disk gang assembly 44 is plugged when the monitored load exceeds the maximum load threshold.

In addition to such threshold-based load monitoring (or as an alternative thereto), the monitored load applied through a given disk gang assembly 44 of an agricultural implement 10 may be compared to the monitored load applied through another disk gang assembly 44 of the implement 10 to determine or infer plugging of one of such gang assemblies 44. For example, it may generally be expected that similarly positioned gang assemblies (e.g., the front gang assemblies 44A or the rear gang assemblies 44B) will experience the same or similar draft loads. As such, when the monitored loads of one gang assembly exceeds the monitored loads of a similarly positioned gang assembly by a given load differential threshold, it may be inferred that the gang assembly experiencing the increased loads is plugged. For instance, the loads applied through the left front disk gang assembly 44A may be continuously compared to the loads applied through the right front disk gang assembly 44A. In the event that the loads applied through one of such gang assemblies 44A exceeds the loads applied through the other of such gang assemblies 44A by the associated load differential threshold (e.g., a threshold value selected based on the current ground speed of the implement 10 and the current disk penetration depth), it may be inferred that the highest loaded front gang assembly 44A is plugged.

In several embodiments, the load applied through each disk gang assembly 44 may be monitored using one or more load sensors 80 provided in operative association with the disk gang assembly 44. In general, the load sensor(s) 80 may correspond to any suitable sensing device or system configured to provide or generate data indicative of the draft load on the associated disk gang assembly 44. For example, the load sensor(s) 80 may correspond to piezoelectric or strain gauge sensors and/or any other suitable sensing devices.

Two different examples of load sensors 80 that can be used to monitor the applied load through a disk gang assembly 44 are shown in FIG. 3. In one embodiment, the load sensor(s) 80 may correspond to one or more load pins provided at one or more associated connection points between the toolbar 48 of the disk gang assembly 44 and the main implement frame 28. For instance, as shown in FIG. 3, the bolts/pins 66, 74 connecting each gang bracket 65, 72 to an associated support arm (e.g., the front support arm 62 or the rear support arm 68) are configured as load pins 80A. In such an embodiment, each load pin 80A may be configured to generate data associated with the load applied through such joint/connection point, which, in turn, is directly indicative of the draft load on the disk gang assembly 44. Alternatively, the load sensor(s) 80 may correspond to one or more load cells (e.g., donut load cells) provided around the attachment bolts/pins at the connection points. In another embodiment, as shown in FIG. 3, the load sensor(s) 80 may correspond to one or more strain gauges 80B provided in operative association with the toolbar 48 of each disk gang assembly 44. In such an embodiment, by detecting the strain applied through the toolbar 48, the associated draft load on the disk gang assembly 44 can be determined. In further embodiments, the load sensor(s) 80 may correspond to any other suitable sensing device or system and/or may be provided in operative association with any other suitable component (e.g., any other suitable component of the disk gang assembly 44) so as to provide an indication of the applied load through each disk gang assembly 44.

Figure 4:
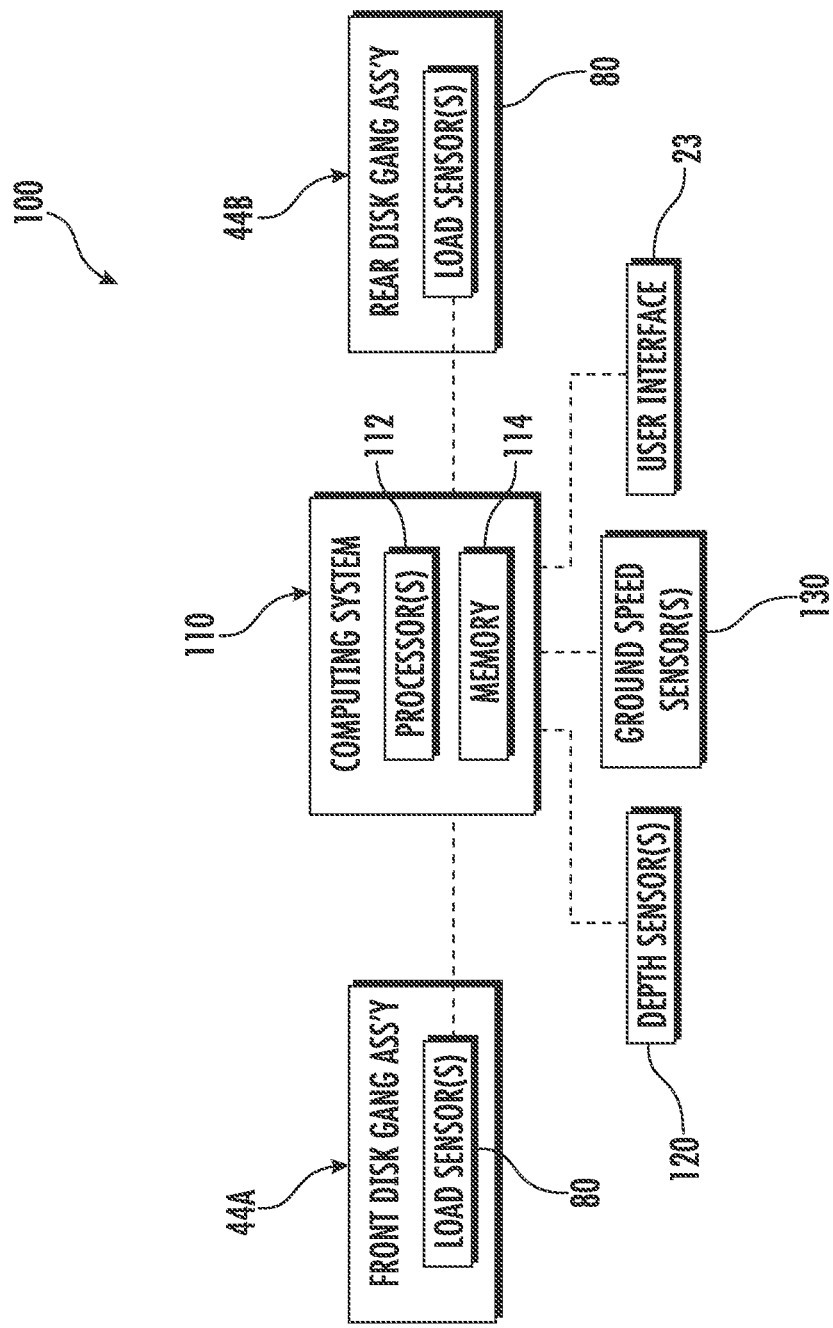
FIG. 4 illustrates a schematic view of one embodiment of a system for detecting material accumulation relative to disk gang assemblies of an agricultural implement in accordance with aspects of the present subject matter.

Referring now to FIG. 4, a schematic view of one embodiment of a system 100 for detecting material accumulation relative to disk gang assemblies of an agricultural implement is illustrated in accordance with aspects of the present subject matter. In general, the system 100 will be described herein with reference to the implement 10 and related disk gang assemblies 44 described above with reference to FIGS. 1-3. However, it should be appreciated by those of ordinary skill in the art that the disclosed system 100 may generally be utilized with agricultural implements having any other suitable implement configuration and/or with disk gang assemblies having any other suitable gang configuration.

In general, the system 100 may include one or more components of an agricultural implement, such as one or more of the components of the implement 10 described above. For example, as shown in FIG. 4, the system 100 may include one or more disk gang assemblies, such as one or more of the front disk gang assemblies 44A and/or one or more of the rear disk gang assemblies 44B of the implement 10. Each disk gang assembly 44 may generally be provided in operative association with one or more load sensors (e.g., the load sensors 80 described above) configured to provide data indicative of the load applied through the disk gang assembly 44. For instance, as described above, one or more load pins or load cells 80A may be provided at the joints or connections between the toolbar 48 of a given disk gang assembly 44 and the main implement frame 28. In addition to such load pin(s) 80A (or as an alternative thereto), one or more strain gauges 80B may be provided in association with the disk gang assembly 44 to allow the applied load through the assembly 44 to be monitored.

In accordance with aspects of the present subject matter, the system 100 may also include a computing system 110 configured to execute various computer-implemented functions. In general, the computing system 110 may comprise any suitable processor-based device known in the art, such as a computing device or any suitable combination of computing devices. Thus, in several embodiments, the computing system 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the computing system 110 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the methods or algorithms described herein. In addition, the computing system 110 may also include various other suitable components, such as a communications circuit or module, one or more input/output channels, a data/control bus and/or the like.

It should be appreciated that the computing system 110 may correspond to an existing computing system of the implement 10 or associated work vehicle 12 or the computing system 110 may correspond to a separate computing system. For instance, in one embodiment, the computing system 110 may form all or part of a separate plug-in module that may be installed in association with the implement 10 or work vehicle 12 to allow for the disclosed system 100 and related methods to be implemented without requiring additional software to be uploaded onto existing computing systems of the implement 10 and/or the work vehicle 12.

In several embodiments, the computing system 110 may be configured to monitor the load applied through each disk gang assembly 44 relative to an associated load threshold. Specifically, in one embodiment, the computing system 110 may be communicatively coupled to the load sensor(s) 80 provided in association with one or more of the disk gang assemblies 44 (e.g., via a wired or wireless connection) to allow the applied load through such assembly(ies) 44 to be monitored. The monitored load may then be compared to the associated load threshold selected based on the current ground speed of the implement 10 and the current depth setting of the harrow disks 46 to determine or infer the "plugging" status of the corresponding gang assembly 44.

For example, in one embodiment, the load threshold may correspond to a maximum load threshold for an anticipated or expected draft load range for the disk gang assembly 44 given the current ground speed of the implement 10 and the current depth setting of the harrow disks 46. In such an embodiment, the computing system 110 may be configured to determine or infer that the corresponding disk gang assembly 44 is in a non-plugged state when the monitored load is at or below the load threshold and that the disk gang assembly 44 is in a plugged state when the monitored load exceeds the load threshold. In another embodiments, the load threshold may correspond to a differential threshold value associated with an anticipated or expected load differential between two disk gang assemblies 44 (e.g., given the current ground speed of the implement 10 and the current depth setting of the harrow disks 46). In such an embodiment, the computing system 110 may be configured to determine or infer that the disk gang assembly 44 experiencing the highest loads is in a plugged state when the load differential between the two disk gang assemblies 44 exceeds the associated load differential threshold.

As indicated above, the load threshold selected for evaluating the plugging status of a disk gang assembly 44 may generally vary as a function of ground speed and disk penetration depth. Thus, in several embodiments, the computing system 110 may be configured to calculate or select an applicable load threshold value based on the current ground speed of the implement 10 and the current penetration depth of the disks 46. To account for variations in the ground speed and/or the penetration depth, the computing system 110 may be configured to utilize one or more look-up tables and/or mathematical relationships to select an appropriate loading threshold. For instance, in one embodiment, the computing system 110 may include a look-up table or mathematical relationship that correlates threshold values for the load threshold to the ground speed of the implement 10, thereby allowing the computing system 110 to select an initial threshold value based on the current ground speed of the implement 10. Such initial threshold value may then be adjusted or corrected (e.g., up or down), as necessary, based on the current penetration depth of the disk blades 46 (e.g., by scaling or adjusting the initial value based on a known relationship between the penetration depth and the threshold values). In another embodiment, the computing system 110 may include a plurality of ground-speed-dependent look-up tables or mathematical relationships (e.g., one for each of a plurality of different ground speeds) that correlates threshold values for the loading threshold to penetration depths of the disk blades at each ground speed, thereby allowing the computing system 110 to select an appropriate threshold value as a function of the penetration depth and ground speed. In such an embodiment, the computing system 110 may be configured to use suitable interpolation techniques to calculate a threshold value when the current ground speed is between two reference ground speeds for which look-up tables and/or mathematical expressions are stored within the computing system's memory 114.

Referring still to FIG. 4, to select the applicable loading threshold, the computing system 110 may generally be configured to receive an input associated with the current penetration depth of the disk blades 46. In one embodiment, this input may be received from the operator. For instance, the operator may select or input the desired or current penetration depth setting via the user interface 23 provided within the cab 22 of the work vehicle 12. Alternatively, the computing system 110 may be configured to actively monitor the current penetration depth of the disk blades 46 via sensor feedback provided by one or more depth sensors 120. For example, in one embodiment, each depth sensor(s) 120 may correspond to a pressure sensor or position sensor provided in operative association with a corresponding disk gang actuator(s) (not shown) of the implement 10. In such an embodiment, the sensor(s) may be configured to monitor the extent to which the actuator(s) has been extended/retracted, thereby allowing the computing system 110 to determine or infer the penetration depth of the disk blades 46 based on the extended/retracted state of the actuator(s). In another embodiment, each depth sensor(s) 120 may correspond to a position sensor (e.g., a rotary or linear potentiometer) configured to monitor the relative position between the toolbar 48 of the corresponding disk gang assembly 44 and the implement's main frame 28, thereby allowing the computing system 110 to determine or infer the penetration depth of the disk blades 46 based on such position data. In even further embodiments, the computing system 110 may be communicatively coupled to any other suitable depth sensor(s) or feedback device(s) that allows the computing system 110 to directly or indirectly monitor/infer the penetration depth of the disk blades 46.

Additionally, as shown in FIG. 4, to allow the computing system 110 to monitor the ground speed of the implement 10, the computing system 110 may be communicatively coupled to one or more ground speed sensors 130. In general, the ground speed sensor(s) 130 may correspond to any suitable sensing device or system that is configured to provide data indicative of the ground speed of the implement 10. For instance, in one embodiment, the ground speed sensor 130 may correspond to a GPS device or any other suitable satellite navigation position system configured to generate data associated with the ground speed of the implement 10. In another embodiment, the ground speed sensor(s) 130 may correspond to a rotary speed sensor(s) configured to monitor the rotational speed of a given component that provides an indication of the ground speed of the implement 10, such as the engine 24 or transmission 26 of the work vehicle 12 or a wheel of the vehicle 12 or implement 10.

It should be appreciated that, in several embodiments, the specific loading threshold value selected for the disk blades 46 of a given disk gang assembly 44 may differ from the threshold value selected for the disk blades 46 of a different disk gang assembly 44 of the implement 10. Specifically, in many instances, the draft loads on the rear disk gang assemblies 44B may be significantly less than the draft loads on the front disk gang assemblies 44A independent of ground speed and penetration depth. As such, the threshold selected for the front disk gang assemblies 44A (e.g., the max load threshold or the load differential threshold) may differ from the threshold selected for the rear disk gang assemblies 44B to accommodate the expected or anticipated difference in the draft loading between such gang assemblies.

As indicated above, the computing system 110 may be configured to determine or infer the "plugging" status of one or more disk gang assemblies by comparing the applied load(s) through such assembly(ies) to an associated loading threshold. Moreover, when it is determined that a given disk gang assembly 44 is plugged or otherwise in a plugged state (e.g., a partially or fully plugged state), the computing system 110 may be further configured to automatically initiate one or more control actions. For example, the computing system 110 may be configured to provide the operator with a notification that one or more disk gang assemblies 44 are in a plugged state. Specifically, in one embodiment, the computing system 110 may be communicatively coupled to the user interface 23 of the work vehicle 12 via a wired or wireless connection to allow notification signals to be transmitted from the computing system 100 to the user interface 23. In such an embodiment, the notification signals may cause the user interface 23 to present a notification to the operator (e.g., by causing a visual or audible notification or indicator to be presented to the operator) which provides an indication that one or more of the disk gang assemblies 44 are in a plugged state. In such instance, the operator may then choose to initiate any suitable corrective action he/she believes is necessary, such as adjusting the penetration depth of the disk blades 46 and/or adjusting the ground speed of the implement 10.

Additionally, in several embodiments, the control action(s) executed by the computing system 110 may include automatically adjusting the operation of the implement 10 and/or the associated work vehicle 12. For instance, in one embodiment, the computing system 110 may be configured to automatically adjust the penetration depth of the disk blade(s) 46, such as by actively controlling the operation of an associated disk gang actuator to raise or lower the disk blade(s) 46 relative to the ground when plugging is detected. In another embodiment, the computing system 110 may be configured to automatically adjust the ground speed of the implement 10 to address plugging-related conditions, such as by actively controlling the engine 24 and/or the transmission 26 of the work vehicle 12.

Figure 5:
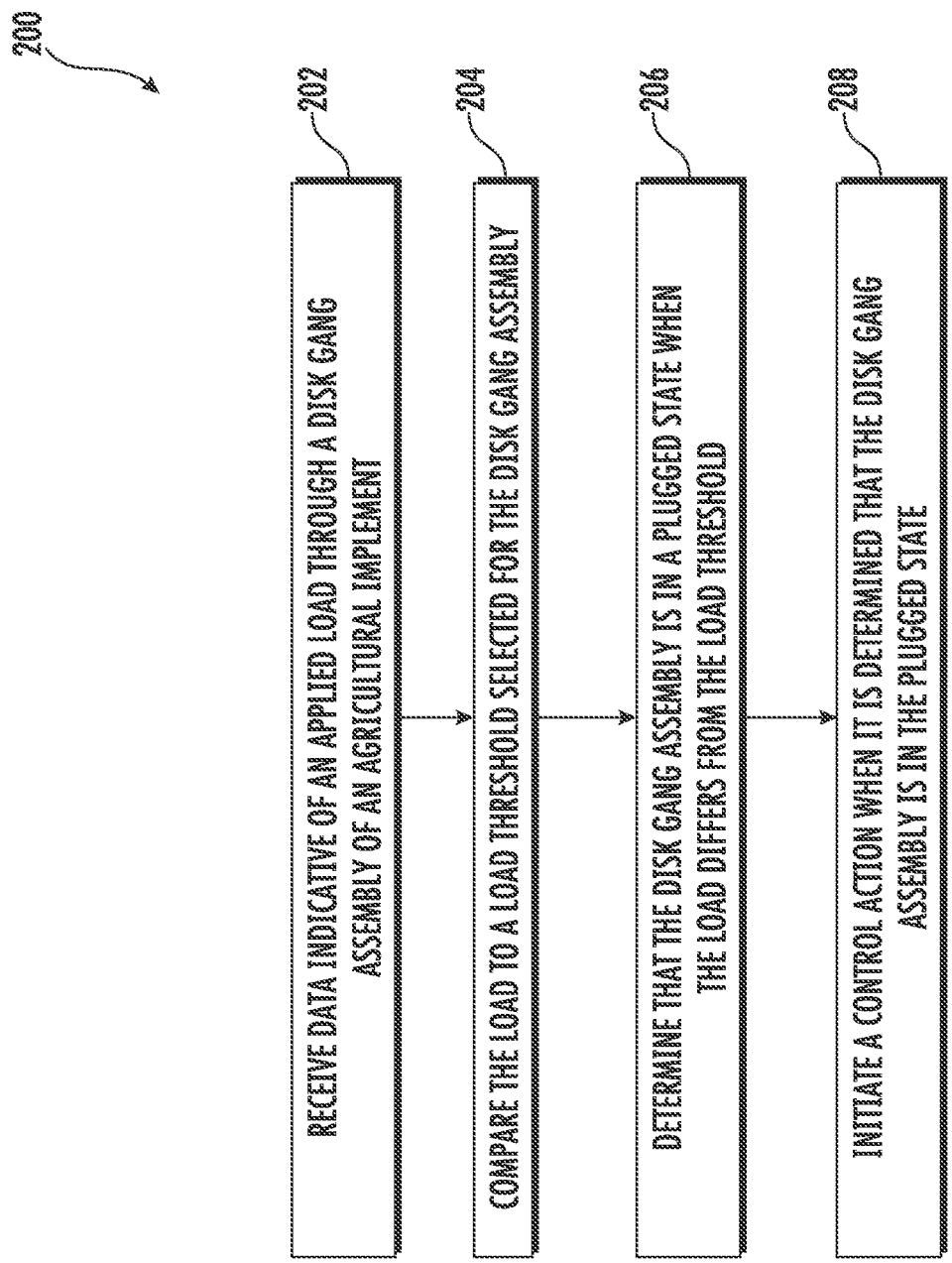
FIG. 5 illustrates a flow diagram of one embodiment of a method for detecting material accumulation relative to disk gang assemblies of an agricultural implement in accordance with aspects of the present subject matter.

Referring now to FIG. 5, a flow diagram of one embodiment of a method 200 for detecting material accumulation relative to disk gang assemblies of an agricultural implement is illustrated in accordance with aspects of the present subject matter. In general, the method 200 will be described herein with reference to the agricultural implement 10, disk gang assemblies 44, and system 100 described above with reference to FIGS. 1-4. However, it should be appreciated by those of ordinary skill in the art that the disclosed method 200 may generally be utilized in association with agricultural implements having any suitable implement configuration, disk gang assemblies having any other suitable gang configuration, and/or systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include receiving data indicative of an applied load through a disk gang assembly of an agricultural implement. For instance, as indicated above, the computing system 110 may be communicatively coupled to one or more load sensors 80 configured to generate data indicative of an applied load through a given disk gang assembly 44. By receiving the data from the associated load sensor(s) 80, the computing system 110 may be configured to monitor the load applied through such disk gang assembly 44.

Additionally, at (204), the method 200 may include comparing the load to a load threshold selected for the disk gang assembly. As indicated above, the computing system 110 may be configured to select a load threshold to be used for inferring or determining the state of plugging of a give disk gang assembly 44. In one embodiment, the load threshold may correspond to a maximum load threshold, such as a maximum load value associated with an anticipated or expected draft load range for a disk gang assembly 44 given the current ground speed of the implement 10 and the current depth setting of the harrow disks 46. In another embodiment, the load threshold may correspond to a differential threshold value associated with an anticipated or expected load differential between two different disk gang assemblies 44 given the current ground speed of the implement 10 and the current depth setting of the harrow disks 46

Moreover, at (206), the method 200 may include determining that the disk gang assembly is in a plugged state when the load differs from the load threshold. Specifically, as indicated above, the computing system 110 may be configured to compare the monitored load for the disk gang assembly 44 to the applicable threshold and determine or infer that the disk gang assembly 44 is in a plugged state when the load differs from the threshold (e.g., when the monitored load exceeds an associated maximum load threshold or when the monitored load exceeds the monitored load of another disk gang assembly by an associated load differential threshold).

Referring still to FIG. 5, at (208), the method 200 may include initiating a control action when it is determined that the disk gang assembly is in the plugged state. For example, as indicated above, the computing system 110 may be configured to automatically initiate a control action when it is determined that a given disk gang assembly 44 is in a plugged state. For instance, in one embodiment, the computing system 100 may be configured to generate an operator notification associated with notifying the operator of the plugged state of the disk gang assembly 44. In addition to such operator notification (or as an alternative thereto), the computing system 110 may be configured to automatically adjust the operation of the implement 10, such as by reducing the ground speed of the implement 10 and/or by adjusting the penetration depth of the disk gang assembly 44.

It is to be understood that the steps of the method 200 are performed by the computing system 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 110 described herein, such as the method 200, is implemented in software code or instructions which are tangibly stored on a tangible computer readable medium. The computing system 110 loads the software code or instructions via a direct interface with the computer readable medium or via a wired and/or wireless network. Upon loading and executing such software code or instructions by the computing system 110, the computing system 110 may perform any of the functionality of the computing system 110 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for detecting material accumulation relative to disk gang assemblies of agricultural implements, the system comprising:
an implement frame;
first and second disk gang assemblies supported relative to the implement frame, each of the first and second disk gang assemblies including a toolbar coupled to the implement frame and a plurality of disks supported by the toolbar;
a first load sensor configured to provide data indicative of an applied load through the first disk gang assembly;
a second load sensor configured to provide data indicative of an applied load through the second disk gang assembly; and
a computing system communicatively coupled to the first and second load sensors, the computing system being configured to:
monitor the loads applied through the first and second disk gang assemblies based on the data provided by the first and second load sensors;

compare the monitored loads to a load threshold, wherein the load threshold comprises a load differential threshold between the first and second disk gang assemblies; and determine that the first disk gang assembly is in a plugged state when the monitored load of the first disk gang assembly exceeds the monitored load of the second disk gang assembly by the load differential threshold.

2. The system of claim 1, wherein the first and second disk gang assemblies comprise either a pair of front disk gang assemblies of the agricultural implement or a pair of rear disk gang assemblies of the agricultural implement.

3. The system of claim 1, wherein the computing system is further configured to automatically initiate a control action when it is determined that the first disk gang assembly is in the plugged state.

4. The system of claim 3, wherein the control comprises at least one of generating an operator notification or automatically adjusting an operation of the agricultural implement.

5. The system of claim 1, wherein the first load sensor comprises a load pin or load cell positioned at a connection point provided between the toolbar of the first disk gang assembly and the implement frame or the second load sensor comprises a load pin or load cell positioned at a connection point provided between the toolbar of the second disk gang assembly and the implement frame.

6. The system of claim 1, wherein the first load sensor comprises a strain gauge provided in operative association with the toolbar of the first disk gang assembly or the second load sensor comprises a strain gauge provided in operative association with the toolbar of the second disk gang assembly.

7. A method for detecting material accumulation relative to disk gang assemblies of an agricultural implement, the agricultural implement including a frame and first and second disk gang assemblies supported relative to the frame, each of the first and second disk gang assemblies including a toolbar coupled to the frame and a plurality of disks supported by the toolbar, the method comprising:

receiving, with a computing system, data indicative of an applied load through each of the first and second disk gang assemblies;

comparing, with the computing system, the applied loads to a load threshold, wherein the load threshold comprises a load differential threshold between the first and second disk gang assemblies;

determining, with the computing system, that the first disk gang assembly is in a plugged state when the applied load through the first disk gang assembly exceeds the applied load through the second disk gang assembly by the load differential threshold; and initiating, with the computing system, a control action when it is determined the first disk gang assembly is in the plugged state.

8. The method of claim 7, wherein the first and second disk gang assemblies comprise either a pair of front disk gang assemblies of the agricultural implement or a pair of rear disk gang assemblies of the agricultural implement.

9. The method of claim 7, wherein initiating the control action when it is determined the first disk gang assembly is in the plugged state comprises generating an operator notification associated with notifying an operator of the agricultural implement of the plugged state of the first disk gang assembly.

10. The method of claim 7, wherein initiating the control action when it is determined the first disk gang assembly is in the plugged state comprises automatically adjusting an operation of the agricultural implement.

11. The method of claim 7, wherein receiving the data indicative of the applied load through each of the first and second disk gang assemblies comprises receiving data from at least one of a load pin or load cell positioned at a connection point provided between the toolbar of the first disk gang assembly and the frame or a load pin or load cell positioned at a connection point provided between the toolbar of the second disk gang assembly and the frame.

12. The method of claim 7, wherein receiving the data indicative of the applied load through each of the first and second disk gang assemblies comprises receiving data from at least one of a strain gauge provided in operative association with the toolbar of the first disk gang assembly or a strain gauge provided in operative association with the toolbar of the second disk gang assembly.

13. A system for detecting material accumulation relative to disk gang assemblies of agricultural implements, the system comprising:

an implement frame and a disk gang assembly supported relative to the implement frame, the disk gang assembly including a toolbar coupled to the implement frame and a plurality of disks supported by the toolbar;

a load sensor configured to provide data indicative of an applied load through the disk gang assembly; and a computing system communicatively coupled to the load sensor, the computing system being configured to:

monitor the load applied through the disk gang assembly based on the data provided by the load sensor;

select a load threshold based at least in part on a ground speed of the agricultural implement and a penetration depth of the plurality of disks of the disk gang assembly;

compare the monitored load to the load threshold selected for the disk gang assembly; and determine that the disk gang assembly is in a plugged state when the monitored load differs from the load threshold.

14. The system of claim 13, wherein the load threshold comprises a maximum load threshold, the computing system being configured to determine that the disk gang assembly is in the plugged state when the monitored load exceeds the maximum load threshold.

15. The system of claim 13, wherein the computing system is further configured to automatically initiate a control action when it is determined that the disk gang assembly is in the plugged state.

16. The system of claim 15, wherein the control comprises at least one of generating an operator notification or automatically adjusting an operation of the agricultural implement.

* * * * *